US005689278A

United States Patent [19]

Barker et al.

[11] Patent Number: 5,689,278

[45] Date of Patent: Nov. 18, 1997

[54] DISPLAY CONTROL METHOD

[75] Inventors: Dean Barker, Chandler; Ralph Cisneros, Tempe, both of Ariz.

[73] Assignee: Motorola, Schaumburg, Ill.

[21] Appl. No.: 415,971

[22] Filed: Apr. 3, 1995

[51] Int. Cl.[6] .................... G09G 3/22

[52] U.S. Cl. .................... 345/74; 315/169.1; 313/309

[58] Field of Search .................... 345/74, 75, 95, 345/66, 67, 98, 100, 102; 359/57; 313/309; 315/169.1, 169.3, 169.4

[56] References Cited

U.S. PATENT DOCUMENTS

| | | | |
|---|---|---|---|
| 4,486,749 | 12/1984 | Kishino et al. | 345/75 |
| 4,658,186 | 4/1987 | Horinouchi | 345/75 |
| 4,870,324 | 9/1989 | Hara | 315/169.1 |
| 5,200,846 | 4/1993 | Hiroki et al. | 359/57 |
| 5,477,110 | 12/1995 | Smith et al. | 315/169.4 |
| 5,498,932 | 3/1996 | Shin et al. | 315/169.1 |

OTHER PUBLICATIONS

Paolo Maltese "Cross–modutation and Disuniformity reduction in the addressing of passive matrix displays" Eurodis play '84, Sep.18–20, 1984; pp. 15–20.

*Primary Examiner*—Richard Hjerpe
*Assistant Examiner*—Amare Mengistu
*Attorney, Agent, or Firm*—Eugene A. Parsons

[57] ABSTRACT

A display (10) utilizes a drive scheme that minimizes power dissipation by reducing the operating frequency at which columns (12) operate. The operating frequency is reduced by positioning column timing signals (32) near an end of a horizontal display time (38,39,48,49) if the next horizontal display time also has data to be displayed.

7 Claims, 3 Drawing Sheets

DISPLAY CONTROL METHOD

BACKGROUND OF THE INVENTION

The present invention relates, in general, to display devices, and more particularly, to a novel method of controlling display devices.

Matrix addressing previously has been utilized in controlling a variety of display devices such as liquid crystal displays, light emitting diode displays, and field emission device displays. Matrix addressed displays generally have a number of rows and a number of columns that are formed as a X-Y matrix. Activating a particular row and a particular column results in a visual image where the row and column intersect or cross. Generally, each row is sequentially enabled and data is simultaneously applied to each column, thus, all columns are simultaneously enabled as each row is enabled.

One problem with such matrix addressing is the power dissipation. In field emission device displays, the majority of power dissipated within the display is capacitive power dissipation associated with switching the column capacitance of all the columns on and then off again for each row.

Accordingly, it is desirable to have a method of controlling a display that minimizes transitions on the columns of the display matrix thereby lowering the power dissipation and increasing the amount of time a display can operate from a battery.

DETAILED DESCRIPTION OF THE DRAWINGS

Figure 1:
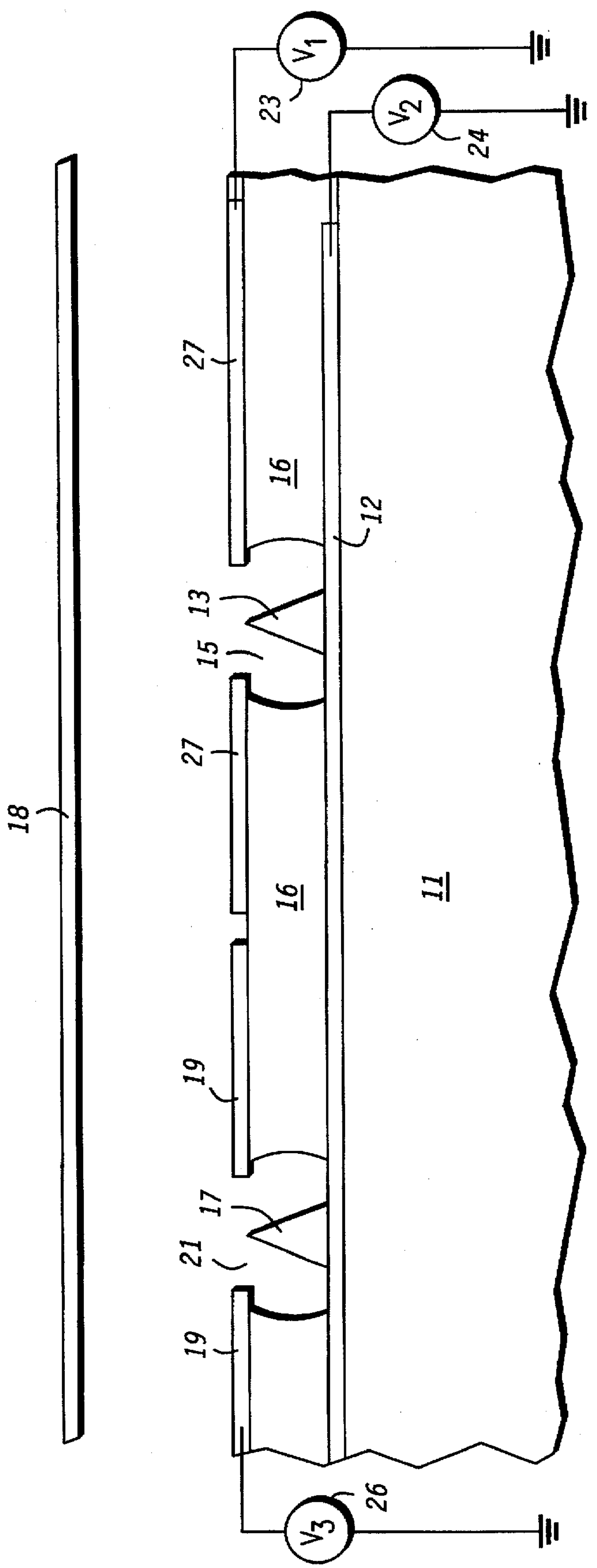
FIG. 1 illustrates an enlarged cross-sectional portion of a display in accordance with the present invention.

FIG. 1 schematically illustrates an enlarged cross-sectional portion of a field emission device display 10 that utilizes matrix addressing. Display 10 includes a substrate 11 on which other portions of display 10 are formed. Substrate 11 typically is an insulating or semi-insulating material, for example, silicon having a dielectric layer or glass. In the preferred embodiment, substrate 11 is glass. A cathode conductor or column 12 generally is formed on a surface of substrate 11 and is utilized to interconnect emission tips or emitters 13 and 17 into a column of display 10. The material utilized for column 12 can be a metal or a low resistance layer such as doped polysilicon. A first extraction grid or first row 27 and a second extraction grid or second row 19 are electrically isolated from substrate 11 and from column 12 by a dielectric layer 16. Emitters 13 and 17 are utilized to emit electrons that are gathered by an anode 18 which is distally disposed from emitters 13 and 17. The space between anode 18 and rows 19 and 27 typically is evacuated to permit electron transit. The surface of anode 18 facing emitters 13 and 17 typically is coated with a phosphor in order to produce an image or display as electrons strike anode 18.

A first voltage source 23 is connected to first row 27 while a second voltage source 24 is connected to column 12 so that a voltage differential can be created between emitter 13 and row 27 to stimulate electron emission from emitter 13.

Similarly, a third voltage source 26 is connected to second row 19 to stimulate electron emission from emitter 17. Each column of display 10 can have a large number of emitters, such as emitters 13 and 17. Additionally, display 10 can have a large number of columns, such as column 12, and a large number of rows such as rows 19 and 27.

Figure 2:
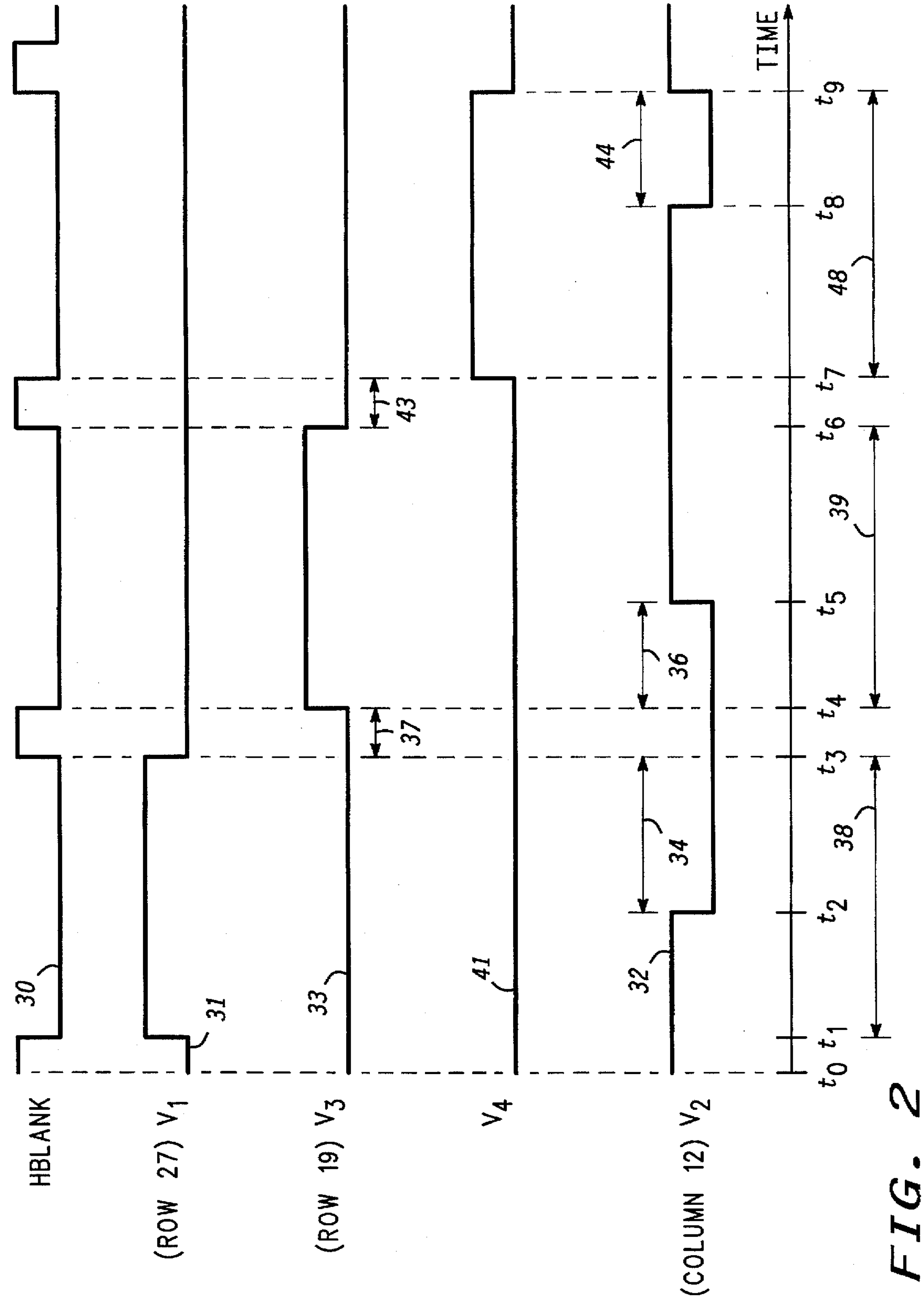
FIG. 2 is a timing diagram illustrating timing relationships of the display of FIG. 1 in accordance with the present invention.

FIG. 2 contains timing diagrams illustrating how voltage sources 23, 24, and 26 are utilized to control display 10 (FIG. 1). The row and column sequencing and timing of display 10 is selected to lower the operating frequency of column 12 (FIG. 1) and reduce the power dissipation of display 10 by a factor of 2 over prior art methods of controlling displays. This low power dissipation is achieved by controlling source 24 (FIG. 1) to minimize the number of transitions thereby reducing the frequency at which source 24 and column 12 operate. The explanation of FIG. 2 containing various references to the elements of display 10 shown in FIG. 1. Although only one column and two rows are shown, the technique is applicable to displays having many rows and many columns.

A first timing diagram 31 ($V_1$) illustrates the output of source 23 shown in FIG. 1. A second timing diagram 33 ($V_3$) illustrates the output of source 26, and a third timing diagram 32 ($V_2$) illustrates the output of second voltage source 24. Also illustrated is a fourth diagram 41 ($V_4$) that will be explained hereinafter. An HBLANK timing diagram 30 illustrates a horizontal blanking signal. When diagram 30 is active (high) display 10 is disabled to allow for data transitions. While diagram 30 is inactive (low) an individual line or row of display 10 is displayed, such a period is referred to as a horizontal display time or a display time. Each successive time that diagram 30 is inactive a subsequent row is scanned in order to provide another line in an image of display 10. Diagram 30 is shown for reference and is not necessary to the operation of display 10 (FIG. 1). Such horizontal blanking signals are well known to those skilled in the art. An individual row, such as row 19 or 27, of display 10 (FIG. 1) is active during each display time when diagram 30 is inactive. A first display time 38 ($t_1$ to $t_3$) represents the time that source 23 ($V_1$) is active, while a second display time 39 ($t_4$ to $t_6$) represents the time that source 26 ($V_3$) is active. A display time 48 represents the time that a subsequent row of display 10 (not shown in FIG. 1) is active as illustrated by a diagram 41.

Information to be displayed or data is applied to each individual column of display 10 (FIG. 1) simultaneously with or just prior to each individual row becoming active. The data determines if the emitter or group of emitters at the intersection of the active row and a column emits electrons. If the data is to result in displaying light, the voltage applied to the column is sufficient to cause electron emission from that particular emitter or group of emitters within that particular pixel. If no light is to be displayed, the voltage applied to the column is such that no electron emission is stimulated from the emitter at the intersection of the active column and the active row, consequently no light is generated. In order to stimulate electron emission during either display time 38 or display time 39, source 24 ($V_2$) must have a lower potential than either source 23 ($V_1$) or source 26 ($V_3$), this is the active state of source 24. Consequently, diagram 32 is active when low. The active or inactive state of source 24 ($V_2$) is determined by the data that is to be displayed at the location of either emitter 13 or emitter 17, respectively. For example, if data is to be displayed (i.e., electron emission is to occur) at the location of emitter 13, source 24 ($V_2$) will have a low potential during display time 38 and if data is to be displayed at the location of emitter 17, source 24 ($V_2$) will have a low potential during time 39. The length of time source 24 is at a low potential or active determines the intensity of the image displayed during either time 38 and or time 39. If source 24 (column 12) is active for the entire time row 27 is active, the image has maximum intensity. For lower intensity images, column 12 is active for less time than row 27. This is typically referred to as pulse width modulation.

In order to reduce the number of transitions on each column and reduce the power dissipation of display 10, the point within a display time that data is applied to a column to stimulate light (i.e., electron emission) varies depending upon the point within the previous display time that data was applied to the column. If the column currently is active at the end of the current display time, data will be applied to enable the column during the beginning of the next display time, and if the column currently is inactive at the end of the current display time, data is applied to enable the column at the end of the next display time. Consequently, if a column is in one state (active or inactive) at the end of one display time, and will be in the same state at the beginning of the next display time, it will remain in that state in between the two display times, thus, reducing the number of transitions made by the column. If the column will have different states at the end of one display time and the beginning of the next display time, the column will have a transition in between the two display times. Consequently, the actual percentage reduction in the number of transitions or operating frequency of the column over prior art techniques depends on the data to be displayed, but in general is reduced by up to approximately 50%. Table 1 below illustrates the column timing placement:

| Placement of Active Column State in the Next Display Time | |
|---|---|
| Current Column State at End of Current Display Time | Position of Column State in Next Display Time |
| inactive | end |
| active | beginning |

where;

end=active time measured from end of display time back toward beginning of the same display time, and beginning=active time measured from beginning of the display time.

As illustrated in FIG. 2, at time $t_0$ diagram 30 (HBLANK) is active so that display 10 (FIG. 1) is disabled. At time $t_1$ diagram 30 becomes inactive and identifies a display time during which a row of display 10 can be enabled to facilitate forming an image on display 10. At time $t_1$, diagram 31 (row 27 in FIG. 1) becomes active in order to facilitate forming an image on anode 18 (FIG. 1). If there is light to be displayed during this time, source 24 (FIG. 1) will have a lower voltage than source 23 for some portion of display time 38. At time $t_3$, diagram 31 (row 27 in FIG. 1) becomes inactive followed by a horizontal blanking time 37 (indicated by an arrow), and diagram 33 (row 19) subsequently becoming active at time $t_4$ during display time 39. Diagram 33 remains active until time $t_6$ when another horizontal blanking time 43 (indicated by an arrow) occurs.

The point within display time 38 that column 12 (FIG. 1) becomes active is illustrated by diagram 32 ($V_2$), and is determined as described hereinbefore and in previous Table 1. Because there was no previous display time, diagram 32 (column 12) is active during the end of display time 38. That is, the timing of diagram 32 is measured from the end of time 38 back toward the beginning of time 38 as shown by an arrow 34. This allows diagram 32 to be active during the end of the current display time and remain active into the subsequent display time 39, as shown by an arrow 36, thereby eliminating a transition of source 24 and column 12 (FIG. 1) and reducing the corresponding operating frequency. In such a case, diagram 32 and source 24 will remain active through the intervening horizontal blanking time and into the subsequent display time as indicated by the portion of diagram 32 between display times 38 and 39.

Timing diagram 41 illustrates an additional row (not shown in FIG, 1) that is driven by a voltage source $V_4$ (not shown in FIG. 1) that is sequentially active after source 26 ($V_3$). Diagram 41 (source $V_4$) becomes active during a third display time 48. Because the state of diagram 32 at the end of display time 39 was inactive, diagram 32 becomes active at the end of time 48 as shown by an arrow 44. Diagram 32 also remains inactive through intervening horizontal blanking time 43, illustrated by an arrow, to reduce the number of transitions of source 24 and column 12 (FIG. 1) thereby lowering the associated operating frequency and power dissipation of display 10 (FIG. 1).

Figure 3:
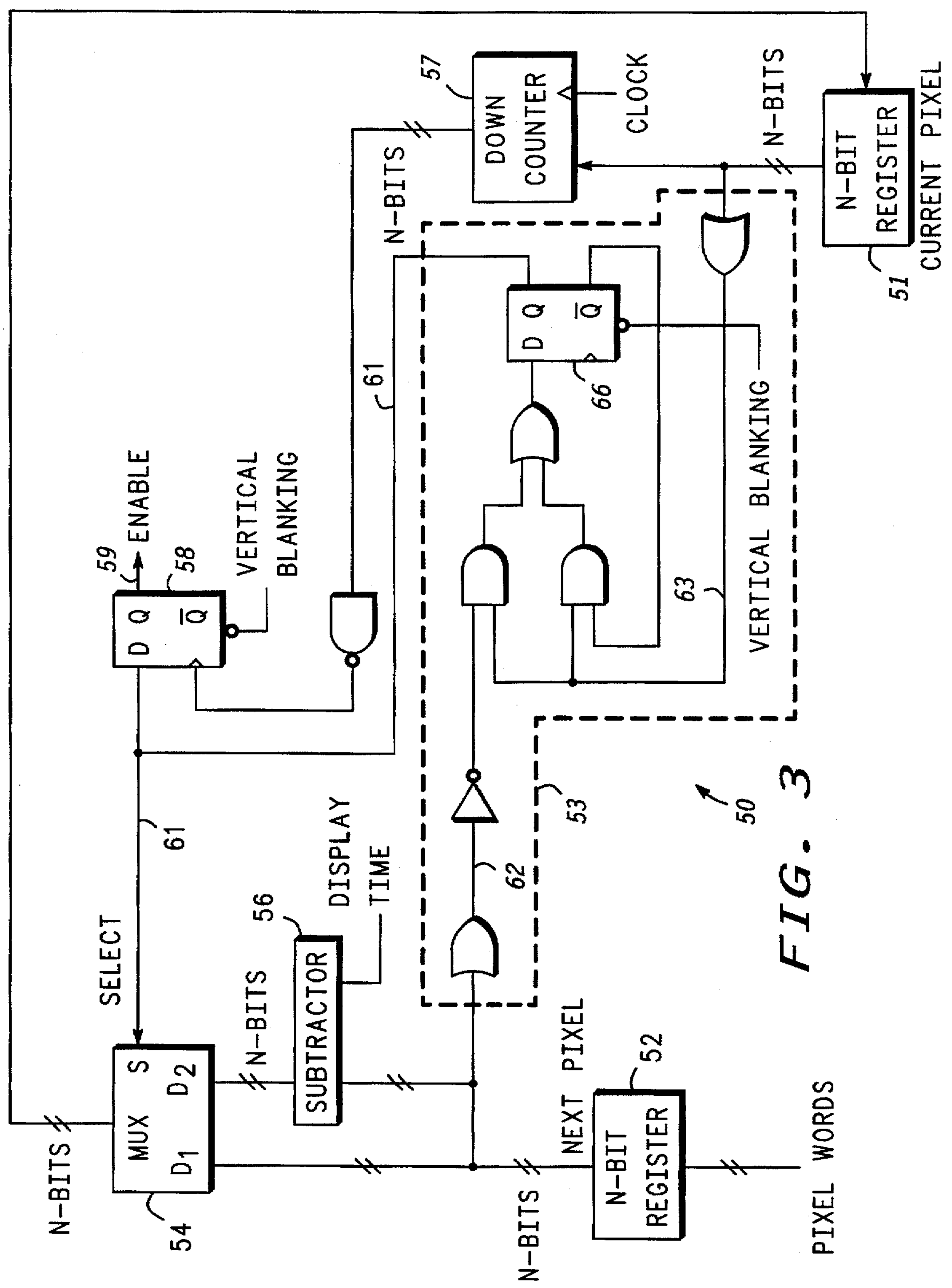
FIG. 3 schematically illustrates a circuit capable of developing the timing diagram illustrated in FIG. 2 in accordance with the present invention.

FIG. 3 illustrates an embodiment of a control circuit 50 that compares the currently displayed pixel and the next pixel to be displayed, and generates an enable signal 59 that controls source 24 according to diagram 32 of FIG. 2 and Table 1 as indicated hereinbefore. Circuit 50 has two N-bit registers, where N represents the number of bits in the data word to be displayed and is also equal to number of bits in the register that holds data words to be displayed or pixel words. A current pixel register 51 contains the pixel word currently being displayed by display 10 of FIG. 1, and a next pixel register 52 contains the next pixel word to be displayed by display 10. The output of register 51 is applied to a downcounter 57, and the parallel outputs of counter 57 are ANDed together to create a clock signal for a column enable flip-flop 58. Signal 59 is the output of flip-flop 58. A select circuit 53 has a select output or select signal 61 that is utilized to select the position within a display time that source 24 (FIG. 1) is enabled as illustrated by arrows 34 and 36 of display times 38 and 39 in FIG. 2.

A pixel currently being displayed is in register 51, and a next pixel to be displayed is loaded into register 52. Circuit 53 ORs the outputs of register 52 together and creates a next signal 62, and also ORs together the outputs of register 51 to create a current signal 63. If the current pixel and the next pixel both have pixels to be displayed, both signals 62 and 63 will be active indicating that the next pixel timing should begin at the beginning of the display time as indicated by arrow 36 in FIG. 2. This state is stored in a first flip-flop 66 and the output of flip-flop 66 becomes signal 61. This state of signal 61 is held until time to display the next pixel. Select signal 61 is used to enable a multiplexer 54 to select the contents of register 52 to be used as the next pixel word to be input into register 51 so that during the next pixel time the current contents of register 52 will become the contents of register 51, thus, the contents of next pixel register 52 eventually becomes the contents of current pixel register 51 during the next pixel time. If register 51 has data to be displayed and register 52 does not have data to be displayed, signals 62 and 63 will have opposite states so that select signal 61 will enable multiplexer 54 to select an output of a subtractor 56 to become the next pixel word to be used as an input for register 51. Subtractor 54 subtracts the value of the next pixel word contained in register 52 from the width of the display time so that the value of the next pixel to be displayed becomes the display time minus the contents of register 52. That value causes signal 59 to be enabled during the last portion of the display time is indicated by arrow 34 in FIG. 2.

Circuit 50 is an embodiment of a control circuit for controlling current source 24 (FIG. 1) according to diagram 32 of FIG. 2. It is to be realized that the control signals can be generated using many various control circuit embodiments and approaches and the invention is not limited by the specific embodiment illustrated.

By now it should be appreciated that there has been provided a novel method of controlling a display. By using the state of current and subsequent display data to position the timing within a display time allows maintaining a signal in an enabled state from one display time into a subsequent display time. This control method reduces the number of transitions on the column signal thereby reducing the operating frequency of the column which reduces the capacitive power dissipation of the display.

We claim:

1. A method of controlling a field emission display comprising:

providing a field emission display having a first row, a second row, and a column, the first row overlying a first emitter and the second row overlying a second emitter;

applying a first voltage to the first row for a first time period;

applying a second voltage to the column near an end of the first time period for initiating electron emission from the first emitter during the first time period; and maintaining the second voltage on the column while applying a third voltage to the second row for a second time period for initiating electron emission from the second emitter near a beginning of the second time period wherein the second time period occurs after the end of the first time period.

2. The method of claim 1 wherein the steps of applying the first voltage, applying the second voltage, and applying the third voltage includes applying the first and third voltages that are less than the second voltage so that electron emission occurs.

3. The method of claim 1 wherein the steps of applying the first voltage to the first row for the first time period and applying the third voltage to the second row for the second time period includes removing the first voltage at the end of the first time period and removing the third voltage at an end of the second time period wherein the removing is accomplished by making the first voltage and the third voltage approximately equal to the second voltage.

4. The method of claim 1 wherein maintaining the second voltage on the column includes removing the second voltage prior to an end of the second time period.

5. The method of claim 4 further including applying a fourth voltage to a third row for a third time period that is after the end of the second time period; and applying the second voltage to the column near a beginning of the third time period for initiating electron emission from a third emitter during the third time period.

6. The method of claim 5 wherein applying the second voltage to the column near the beginning of the third time period includes removing the second voltage prior to an end of the third time period.

7. The method of claim 4 further including applying a fourth voltage to a third row for a third time period that is after the end of the second time period; and applying the second voltage to the column near an end of the third time period for initiating electron emission from a third emitter during the third time period.

* * * * *